(12) United States Patent
Mollinger et al.

(10) Patent No.: US 8,336,269 B1
(45) Date of Patent: *Dec. 25, 2012

(54) SIDING HAVING FACING AND BACKING PORTION WITH GROOVED AND RIBBED BACKING PORTION SURFACE

(75) Inventors: Paul J. Mollinger, Blacklick, OH (US); Paul R. Pelfrey, Wheelersburg, OH (US); Larry R. Fairbanks, Columbus, OH (US)

(73) Assignee: Exterior Portfolio LLC, Atlanta, GA (US)

( * ) Notice: Subject to any disclaimer, the term of this patent is extended or adjusted under 35 U.S.C. 154(b) by 1048 days.

This patent is subject to a terminal disclaimer.

(21) Appl. No.: 11/234,073

(22) Filed: Sep. 23, 2005

Related U.S. Application Data

(63) Continuation-in-part of application No. 11/234,073, filed on Sep. 23, 2005, which is a continuation-in-part of application No. 10/688,750, filed on Oct. 17, 2003, now abandoned.

(60) Provisional application No. 60/746,708, filed on May 8, 2006.

(51) Int. Cl.
 E04B 1/70 (2006.01)
 B32B 3/30 (2006.01)
 E04F 13/075 (2006.01)
(52) U.S. Cl. ............... 52/302.4; 52/309.8; 428/167
(58) Field of Classification Search ............... 52/302.4, 52/309.8, 309.9; 428/156, 158, 159, 160, 428/167, 172
See application file for complete search history.

(56) References Cited

U.S. PATENT DOCUMENTS

| | | | |
|---|---|---|---|
| 1,589,675 A | 6/1926 | Belding | 52/522 |
| 1,728,934 A | 9/1929 | Hogenson | 206/322 |
| 1,871,887 A | 8/1932 | Jasinski | |
| 1,886,363 A | 11/1932 | Aufderheide | |
| 1,888,417 A | 11/1932 | Aberson | |
| 1,958,572 A | 5/1934 | Gilchrist | |
| 2,094,688 A | 10/1937 | Wallace et al. | |
| 2,115,172 A | 4/1938 | Kirschbraun | |
| 2,130,911 A | 9/1938 | Teunon | |
| 2,151,220 A | 3/1939 | Mattes | |
| 2,246,377 A | 6/1941 | Mattes | |
| 2,282,462 A | 5/1942 | Snyder | |
| 2,305,280 A | 12/1942 | Strunk et al. | |
| 2,308,789 A | 1/1943 | Stagg | |
| 2,317,926 A | 4/1943 | Lindahl | |
| 2,618,815 A | 11/1952 | Iezzi | |

(Continued)

FOREIGN PATENT DOCUMENTS

CA 2203720 A1 10/1998
(Continued)

OTHER PUBLICATIONS

Jim Weiker, "Crane puts new face on siding," The Columbus Dispatch, May 9, 2002, 3 pages.

(Continued)

*Primary Examiner* — Michael Safavi
(74) *Attorney, Agent, or Firm* — Standley Law Group LLP

(57) ABSTRACT

A backed paneling unit comprised of a backing portion that includes at least one rib. In an exemplary embodiment, a rib may be adjacent to a drainage groove or between adjacent drainage grooves. A rib may enable ventilation behind the backing portion. In addition, a rib may also assist with liquid drainage.

25 Claims, 12 Drawing Sheets

U.S. PATENT DOCUMENTS

| | | | |
|---|---|---|---|
| 2,660,217 A | 11/1953 | Lawson | |
| 2,830,546 A | 4/1958 | Rippe | 108/17 |
| 2,961,804 A | 11/1960 | Beckman | |
| D196,230 S | 9/1963 | Raftery et al. | D13/1 |
| 3,110,130 A | 11/1963 | Trachtenberg | |
| 3,159,943 A | 12/1964 | Sugar et al. | 50/200 |
| 3,233,382 A | 2/1966 | Graveley, Jr. | 52/522 |
| 3,246,436 A | 4/1966 | Roush | 52/303 |
| 3,289,365 A | 12/1966 | McLaughlin et al. | 52/173 |
| 3,289,380 A | 12/1966 | Charniga, Jr. | 52/716 |
| 3,325,952 A | 6/1967 | Trachtenberg | 52/276 |
| D208,251 S | 8/1967 | Facer | D13/1 |
| 3,387,418 A | 6/1968 | Tyrer | 52/242 |
| 3,399,916 A | 9/1968 | Ensor | 287/189.36 |
| 3,468,086 A | 9/1969 | Warner | |
| 3,473,274 A | 10/1969 | Godes | 52/127 |
| 3,520,099 A | 7/1970 | Mattes | 52/531 |
| 3,552,078 A | 1/1971 | Mattes | 52/520 |
| 3,555,762 A | 1/1971 | Costanzo, Jr. | 52/588 |
| 3,616,103 A | 10/1971 | Greiner et al. | |
| 3,637,459 A | 1/1972 | Parish et al. | 161/161 |
| 3,703,795 A | 11/1972 | Mattes | 52/521 |
| 3,800,016 A | 3/1974 | Roberts | |
| 3,815,310 A | 6/1974 | Kessler | 52/531 |
| 3,826,054 A | 7/1974 | Culpepper, Jr. | 52/309 |
| 3,895,087 A | 7/1975 | Ottinger et al. | |
| 3,940,528 A | 2/1976 | Roberts | |
| 3,969,866 A | 7/1976 | Kyne | 52/588 |
| 3,970,502 A | 7/1976 | Turner | 156/310 |
| 3,998,021 A * | 12/1976 | Lewis | 52/531 |
| 4,001,997 A | 1/1977 | Saltzman | 52/521 |
| 4,033,802 A | 7/1977 | Culpepper, Jr. et al. | 156/71 |
| 4,034,528 A | 7/1977 | Sanders et al. | 52/309.4 |
| 4,048,101 A | 9/1977 | Nakamachi et al. | |
| 4,081,939 A | 4/1978 | Culpepper, Jr. et al. | 52/535 |
| 4,096,011 A | 6/1978 | Sanders et al. | 156/196 |
| 4,102,106 A | 7/1978 | Golder et al. | 52/533 |
| 4,104,841 A | 8/1978 | Naz | 52/519 |
| 4,109,041 A | 8/1978 | Tellman | |
| 4,118,166 A | 10/1978 | Bartrum | 425/462 |
| 4,154,040 A | 5/1979 | Pace | |
| 4,181,286 A | 1/1980 | Van Doren | |
| 4,188,762 A | 2/1980 | Tellman | 52/541 |
| 4,189,885 A | 2/1980 | Fritz | |
| 4,241,554 A | 12/1980 | Infantino | |
| 4,272,576 A | 6/1981 | Britson | 428/100 |
| 4,274,236 A * | 6/1981 | Kessler | 52/309.8 |
| 4,275,540 A | 6/1981 | Keller | |
| 4,277,526 A | 7/1981 | Jackson | |
| 4,279,106 A | 7/1981 | Gleason et al. | 52/100 |
| 4,299,069 A | 11/1981 | Neumann | |
| 4,319,439 A | 3/1982 | Gussow | 52/288 |
| 4,320,613 A | 3/1982 | Kaufman | 52/521 |
| 4,327,528 A | 5/1982 | Fritz | 52/309.1 |
| 4,352,771 A | 10/1982 | Szabo | |
| 4,389,824 A | 6/1983 | Anderson | 52/211 |
| 4,424,655 A | 1/1984 | Trostle | 52/520 |
| 4,429,503 A | 2/1984 | Holliday | 52/410 |
| 4,450,665 A | 5/1984 | Katz | 52/522 |
| D274,947 S | 7/1984 | Culpepper, Jr. et al. | D25/73 |
| 4,492,064 A | 1/1985 | Bynoe | |
| 4,506,486 A | 3/1985 | Culpepper, Jr. et al. | 52/529 |
| 4,593,512 A | 6/1986 | Funaki | 52/519 |
| 4,608,800 A | 9/1986 | Fredette | 52/656 |
| 4,649,008 A | 3/1987 | Johnstone et al. | 264/177.1 |
| 4,680,911 A | 7/1987 | Davis et al. | 52/521 |
| D291,249 S | 8/1987 | Manning | D25/73 |
| 4,694,628 A | 9/1987 | Vondergoltz et al. | 52/520 |
| 4,709,519 A | 12/1987 | Liefer et al. | 52/98 |
| 4,716,645 A | 1/1988 | Pittman et al. | 29/527.1 |
| 4,782,638 A | 11/1988 | Hovind | 52/547 |
| 4,814,413 A | 3/1989 | Thibaut et al. | 528/80 |
| 4,843,790 A | 7/1989 | Taravella | 52/211 |
| 4,856,975 A | 8/1989 | Gearhart | 425/131.1 |
| 4,864,788 A | 9/1989 | Tippmann | 52/309.8 |
| 4,911,628 A | 3/1990 | Heilmayr et al. | 425/131.1 |
| 4,920,709 A | 5/1990 | Garries et al. | 52/85 |
| 4,930,287 A | 6/1990 | Volk et al. | 52/748 |
| 4,955,169 A * | 9/1990 | Shisko | 52/536 |
| 4,962,622 A | 10/1990 | Albrecht et al. | 52/630 |
| 4,969,302 A | 11/1990 | Coggan et al. | 52/309.8 |
| D316,299 S | 4/1991 | Hurlburt | D25/119 |
| 5,016,415 A | 5/1991 | Kellis | 52/522 |
| 5,022,204 A | 6/1991 | Anderson | 52/211 |
| 5,022,207 A | 6/1991 | Hartnett | 52/537 |
| 5,024,045 A | 6/1991 | Fluent et al. | 53/443 |
| 5,050,357 A | 9/1991 | Lawson | 52/314 |
| 5,060,444 A | 10/1991 | Paquette | |
| 5,080,950 A | 1/1992 | Burke | 428/81 |
| 5,090,174 A | 2/1992 | Fragale | 52/309.9 |
| 5,103,612 A | 4/1992 | Wright | 52/288 |
| 5,173,337 A | 12/1992 | Nelson | |
| 5,224,315 A | 7/1993 | Winter, IV | 52/309.8 |
| 5,230,377 A | 7/1993 | Berman | 160/327 |
| D342,579 S | 12/1993 | Mason | D25/119 |
| 5,282,344 A | 2/1994 | Moore | 52/716.8 |
| 5,283,102 A | 2/1994 | Sweet et al. | |
| 5,303,525 A | 4/1994 | Magee | 52/306 |
| 5,306,548 A | 4/1994 | Zabrocki et al. | 428/215 |
| 5,318,737 A | 6/1994 | Trabert et al. | 264/171 |
| 5,347,784 A | 9/1994 | Crick et al. | 52/520 |
| 5,353,560 A | 10/1994 | Heydon | |
| 5,363,623 A | 11/1994 | King | 52/520 |
| 5,387,381 A | 2/1995 | Saloom | |
| 5,394,672 A | 3/1995 | Seem | |
| 5,415,921 A | 5/1995 | Grohman | 428/216 |
| 5,419,863 A | 5/1995 | Henderson | |
| D361,138 S | 8/1995 | Moore et al. | D25/119 |
| 5,443,878 A | 8/1995 | Treloar et al. | 428/60 |
| 5,461,839 A | 10/1995 | Beck | 52/519 |
| 5,465,486 A | 11/1995 | King | 29/897.32 |
| 5,465,543 A | 11/1995 | Seifert | 52/309.8 |
| 5,475,963 A | 12/1995 | Chelednik | 52/545 |
| 5,482,667 A | 1/1996 | Dunton et al. | 264/136 |
| 5,502,940 A * | 4/1996 | Fifield | 52/309.12 |
| 5,522,199 A | 6/1996 | Pearce | |
| 5,537,791 A | 7/1996 | Champagne | 52/520 |
| 5,542,222 A | 8/1996 | Wilson et al. | |
| 5,548,940 A | 8/1996 | Baldock | 53/430 |
| 5,551,204 A | 9/1996 | Mayrand | 52/795.1 |
| 5,560,170 A | 10/1996 | Ganser et al. | 52/539 |
| 5,564,246 A | 10/1996 | Champagne | 52/548 |
| 5,565,056 A | 10/1996 | Lause et al. | 156/243 |
| 5,575,127 A | 11/1996 | O'Neal | 52/520 |
| 5,581,970 A | 12/1996 | O'Shea | 52/718.01 |
| 5,586,415 A | 12/1996 | Fisher et al. | 52/58 |
| 5,598,677 A | 2/1997 | Rehm, III | 52/407.1 |
| 5,613,337 A | 3/1997 | Plath et al. | 52/533 |
| 5,622,020 A | 4/1997 | Wood | 52/546 |
| 5,634,314 A | 6/1997 | Champagne | 52/712 |
| 5,651,227 A | 7/1997 | Anderson | 52/520 |
| 5,661,939 A | 9/1997 | Coulis et al. | 52/519 |
| 5,662,977 A | 9/1997 | Spain et al. | 428/42.1 |
| 5,664,376 A | 9/1997 | Wilson et al. | |
| 5,675,955 A | 10/1997 | Champagne | 52/521 |
| 5,678,367 A | 10/1997 | Kline | 52/211 |
| 5,694,728 A | 12/1997 | Heath, Jr. et al. | 52/554 |
| 5,720,114 A | 2/1998 | Guerin | 33/451 |
| 5,729,946 A | 3/1998 | Beck | 52/520 |
| 5,737,881 A | 4/1998 | Stocksieker | 52/90.1 |
| 5,765,333 A | 6/1998 | Cunningham | 52/481.1 |
| 5,768,844 A | 6/1998 | Grace, Sr. et al. | 52/529 |
| 5,791,093 A | 8/1998 | Diamond | 52/36.5 |
| 5,806,185 A | 9/1998 | King | 29/897.32 |
| 5,809,731 A | 9/1998 | Reiss | 52/533 |
| 5,829,206 A | 11/1998 | Bachman | 52/94 |
| 5,836,113 A | 11/1998 | Bachman | 52/94 |
| D402,770 S | 12/1998 | Hendrickson et al. | D25/141 |
| 5,857,303 A | 1/1999 | Beck et al. | 52/520 |
| 5,858,522 A | 1/1999 | Turk et al. | |
| 5,860,259 A * | 1/1999 | Laska | 52/302.3 |
| 5,866,054 A | 2/1999 | Dorchester et al. | |
| 5,866,639 A | 2/1999 | Dorchester et al. | 523/171 |
| 5,869,176 A | 2/1999 | Dorchester et al. | |
| 5,878,543 A | 3/1999 | Mowery | 52/519 |
| 5,885,502 A | 3/1999 | DeAngelis et al. | |
| 5,913,791 A | 6/1999 | Baldwin | |

| | | | |
|---|---|---|---|
| 5,946,876 A | 9/1999 | Grace, Sr. et al. | 52/520 |
| 5,956,914 A | 9/1999 | Williamson | 52/520 |
| 5,974,756 A | 11/1999 | Alvarez et al. | 52/553 |
| 6,029,415 A | 2/2000 | Culpepper et al. | 52/522 |
| 6,035,587 A | 3/2000 | Dressler | 52/97 |
| 6,047,507 A | 4/2000 | Lappin et al. | 52/212 |
| 6,050,041 A | 4/2000 | Mowery et al. | 52/520 |
| 6,055,787 A | 5/2000 | Gerhaher et al. | |
| 6,086,997 A | 7/2000 | Patel et al. | 428/355 BL |
| D429,009 S | 8/2000 | Ginzel | D25/136 |
| 6,122,877 A | 9/2000 | Hendrickson et al. | |
| 6,132,669 A | 10/2000 | Valyi et al. | |
| 6,161,354 A | 12/2000 | Gilbert et al. | 52/520 |
| 6,185,891 B1 * | 2/2001 | Moore | 52/309.7 |
| 6,187,424 B1 | 2/2001 | Kjellqvist et al. | 428/220 |
| 6,195,952 B1 * | 3/2001 | Culpepper et al. | 52/522 |
| 6,223,488 B1 | 5/2001 | Pelfrey et al. | 52/302.1 |
| 6,228,507 B1 | 5/2001 | Hahn | |
| 6,233,890 B1 | 5/2001 | Tonyan | |
| 6,263,574 B1 | 7/2001 | Lubker, II et al. | 29/897.32 |
| 6,272,797 B1 | 8/2001 | Finger | 52/94 |
| D447,820 S | 9/2001 | Grace | D25/119 |
| 6,282,858 B1 | 9/2001 | Swick | 52/533 |
| D448,865 S | 10/2001 | Manning | D25/141 |
| 6,295,777 B1 | 10/2001 | Hunter et al. | 52/519 |
| D450,138 S | 11/2001 | Barber | D25/141 |
| 6,321,500 B1 | 11/2001 | Manning et al. | 52/555 |
| 6,336,988 B1 | 1/2002 | Enlow et al. | 156/238 |
| 6,348,512 B1 | 2/2002 | Adriani | 521/85 |
| D454,962 S | 3/2002 | Grace | D25/119 |
| 6,355,193 B1 | 3/2002 | Stott | |
| 6,358,585 B1 | 3/2002 | Wolff | 428/36.6 |
| 6,360,508 B1 | 3/2002 | Pelfrey et al. | 52/520 |
| 6,363,676 B1 | 4/2002 | Martion, III | 52/519 |
| 6,367,220 B1 | 4/2002 | Krause et al. | 52/512 |
| 6,393,792 B1 | 5/2002 | Mowery et al. | |
| 6,442,912 B1 | 9/2002 | Phillips et al. | 52/741.4 |
| 6,516,577 B2 | 2/2003 | Pelfrey et al. | 52/302.1 |
| 6,516,578 B1 | 2/2003 | Hunsaker | |
| D471,292 S | 3/2003 | Barber | D25/141 |
| 6,526,718 B2 | 3/2003 | Manning et al. | 52/555 |
| 6,539,675 B1 | 4/2003 | Gile | 52/96 |
| 6,590,004 B1 | 7/2003 | Zehner | |
| 6,594,965 B2 | 7/2003 | Coulton | 52/302.1 |
| 6,625,939 B1 | 9/2003 | Beck et al. | 52/105 |
| D481,804 S | 11/2003 | Pelfrey | D25/119 |
| 6,673,868 B2 | 1/2004 | Choulet | 525/70 |
| 6,716,522 B2 | 4/2004 | Matsumoto et al. | |
| 6,726,864 B2 | 4/2004 | Nasr et al. | |
| 6,752,941 B2 | 6/2004 | Hills | |
| 6,784,230 B1 | 8/2004 | Patterson et al. | 524/13 |
| 6,824,850 B2 | 11/2004 | Nourigat | |
| 6,865,849 B1 | 3/2005 | Mollinger et al. | 52/96 |
| 6,886,301 B2 | 5/2005 | Schilger | 52/302.1 |
| 6,971,211 B1 | 12/2005 | Zehner | |
| 6,988,345 B1 | 1/2006 | Pelfrey et al. | |
| 7,040,067 B2 | 5/2006 | Mowery et al. | |
| 7,188,454 B2 | 3/2007 | Mowery et al. | |
| 7,204,062 B2 | 4/2007 | Fairbanks et al. | |
| 7,467,500 B2 | 12/2008 | Fairbanks et al. | |
| 2001/0041256 A1 | 11/2001 | Heilmayr | 428/318.6 |
| 2002/0018907 A1 | 2/2002 | Zehner | 428/537.1 |
| 2002/0020125 A1 | 2/2002 | Pelfrey et al. | 52/302.1 |
| 2002/0025420 A1 | 2/2002 | Wanat et al. | 428/213 |
| 2002/0029537 A1 | 3/2002 | Manning et al. | 52/518 |
| 2002/0054996 A1 | 5/2002 | Rheenen | 428/420 |
| 2002/0056244 A1 | 5/2002 | Hertweck | 52/520 |
| 2002/0076544 A1 | 6/2002 | DeWorth et al. | 428/317.1 |
| 2002/0078650 A1 | 6/2002 | Bullinger et al. | 52/539 |
| 2002/0090471 A1 | 7/2002 | Burger et al. | |
| 2002/0092256 A1 | 7/2002 | Hendrickson et al. | |
| 2002/0108327 A1 | 8/2002 | Shaw | 52/211 |
| 2002/0112427 A1 | 8/2002 | Baldwin | |
| 2002/0145229 A1 | 10/2002 | Kuriger et al. | |
| 2002/0177658 A1 | 11/2002 | Tajima et al. | 525/85 |
| 2002/0189182 A1 | 12/2002 | Record | |
| 2003/0014936 A1 | 1/2003 | Watanabe | 52/518 |
| 2003/0024192 A1 * | 2/2003 | Spargur | 52/309.4 |
| 2003/0056458 A1 | 3/2003 | Black et al. | 52/541 |
| 2003/0121225 A1 | 7/2003 | Hunsaker | |
| 2003/0131551 A1 | 7/2003 | Mollinger et al. | 52/518 |
| 2003/0154664 A1 | 8/2003 | Beck et al. | 52/105 |
| 2004/0003566 A1 | 1/2004 | Sicuranza | 52/518 |
| 2004/0026021 A1 | 2/2004 | Groh et al. | 156/244.12 |
| 2004/0142157 A1 | 7/2004 | Melkonian | 428/292.1 |
| 2004/0182026 A1 | 9/2004 | Clarke | |
| 2004/0211141 A1 | 10/2004 | Sandy | 52/506.01 |
| 2005/0064128 A1 | 3/2005 | Lane et al. | |
| 2005/0081468 A1 * | 4/2005 | Wilson et al. | 52/528 |
| 2005/0087908 A1 | 4/2005 | Nasr et al. | |
| 2005/0097861 A1 * | 5/2005 | Schroer et al. | 52/782.1 |
| 2006/0026920 A1 | 2/2006 | Fairbanks et al. | |
| 2006/0053740 A1 | 3/2006 | Wilson et al. | |
| 2006/0075712 A1 * | 4/2006 | Gilbert et al. | 52/520 |
| 2006/0123729 A1 | 6/2006 | Myers et al. | |
| 2006/0156668 A1 * | 7/2006 | Nasvik | 52/516 |
| 2006/0157634 A1 | 7/2006 | Nasvik | |
| 2006/0197257 A1 | 9/2006 | Burt et al. | |
| 2007/0227087 A1 | 10/2007 | Nasr et al. | |
| 2009/0056257 A1 | 3/2009 | Mollinger et al. | |
| 2009/0062413 A1 | 3/2009 | Adur et al. | |
| 2009/0062431 A1 | 3/2009 | Nasr et al. | |
| 2009/0068406 A1 | 3/2009 | Race et al. | |

FOREIGN PATENT DOCUMENTS

| | | |
|---|---|---|
| CA | 2359639 A1 | 4/2002 |
| CA | 96829 | 8/2002 |
| CA | 2267000 | 4/2003 |
| EP | 1086 988 A1 | 3/2001 |
| FR | 2538293 A2 | 6/1984 |
| FR | 2627211 A1 | 8/1989 |
| GB | 1068202 | 5/1967 |
| GB | 2101944 | 8/2001 |
| JP | 364001539 A | 1/1989 |
| JP | 09141752 A | 6/1997 |
| JP | 410018555 A | 1/1998 |
| JP | 02001079951 A | 3/2001 |
| WO | WO 00/55446 | 9/2000 |
| WO | 2009/100340 A1 | 8/2009 |

OTHER PUBLICATIONS

Crane in the News, International Builders' Shoe Preview, Jan./Feb. 2003, 1 page.

Dupont Dow, "Adhesives", web site print outs from www.dupontdow.com, 1999, printed Aug. 12, 2000, 3 pages.

Dupont Dow, "Neoprene—Grades of Neoprene—AquaStikTM Water Based Polychloroprene.", web site print outs from www.dupontdow.com, 1999, printed Aug. 12, 2000, 2 pages.

Dupont Dow, "Neoprene—Grades of Neoprene—Neoprene Solid Grades for Solvent-Based Adhesives.", web site print outs from www.dupontdow.com, publication date not available, printed Aug. 12, 2000, 2 pages.

Owens Corning, Innovations for Living, "What Do I Look For in Quality Vinyl Siding?", 1996-2002, printed Nov. 9, 2002, 1 page.

Sweet's General Building & Renovation, 1995 Catalog File; section 07460 on Siding, pp. 4-20.

"New Craneboard sold core siding redefines home exterior siding," Crane Performance Siding news release online, Mar. 20, 2001, 3 pages.

* cited by examiner

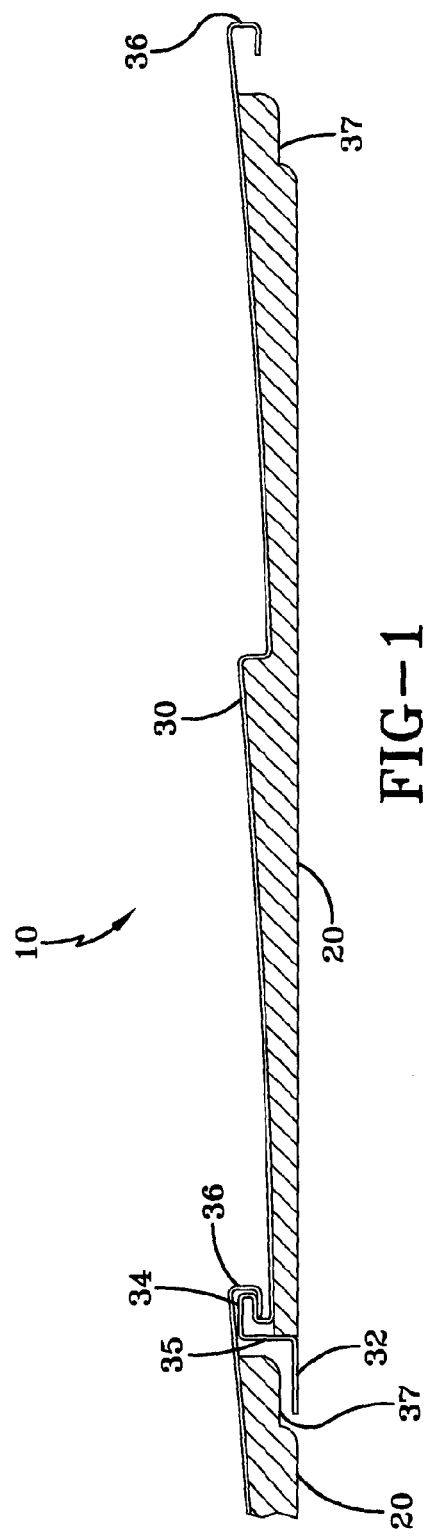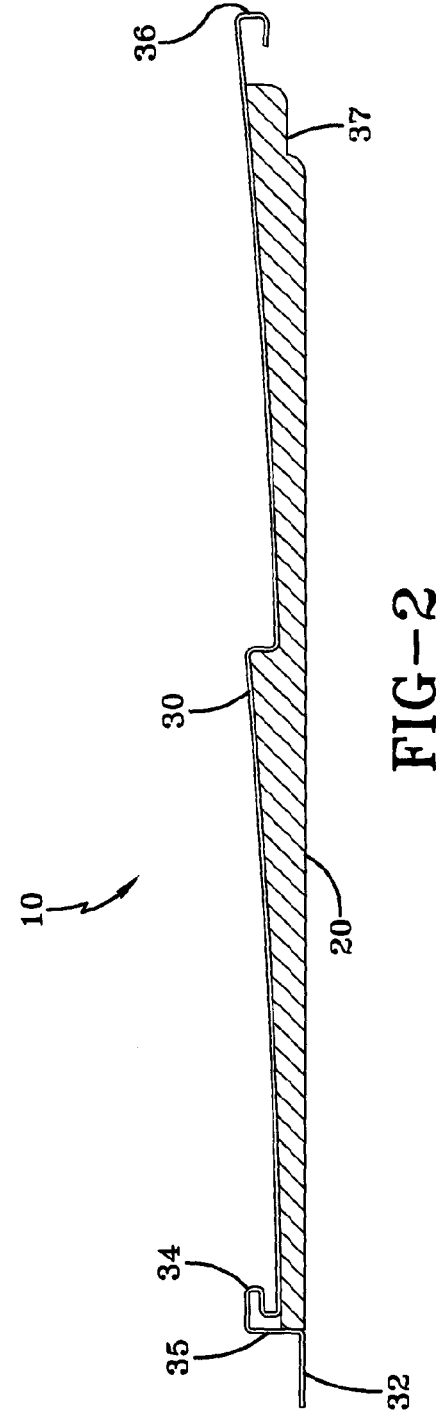

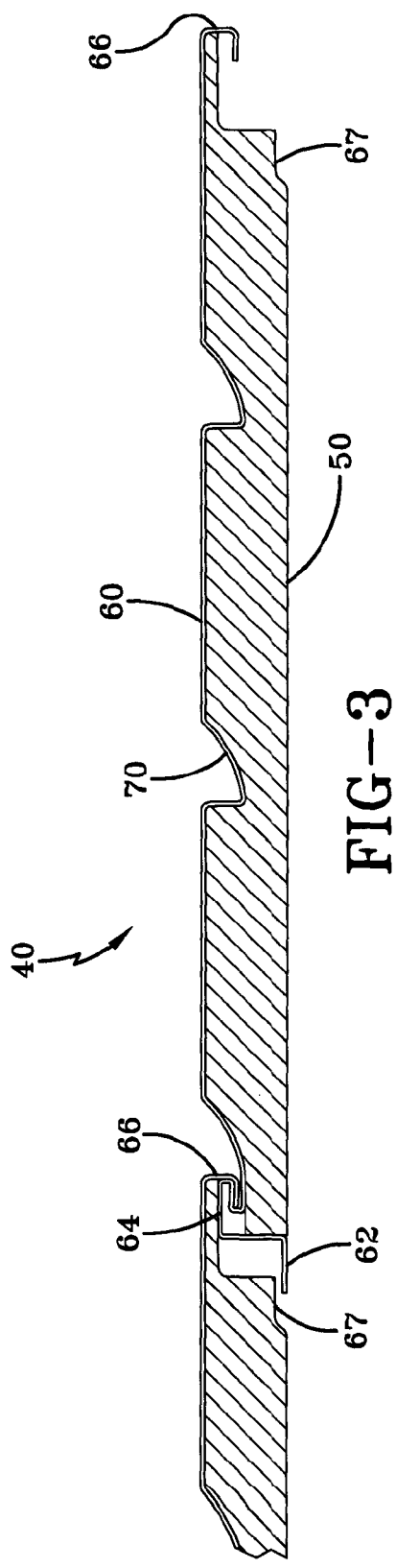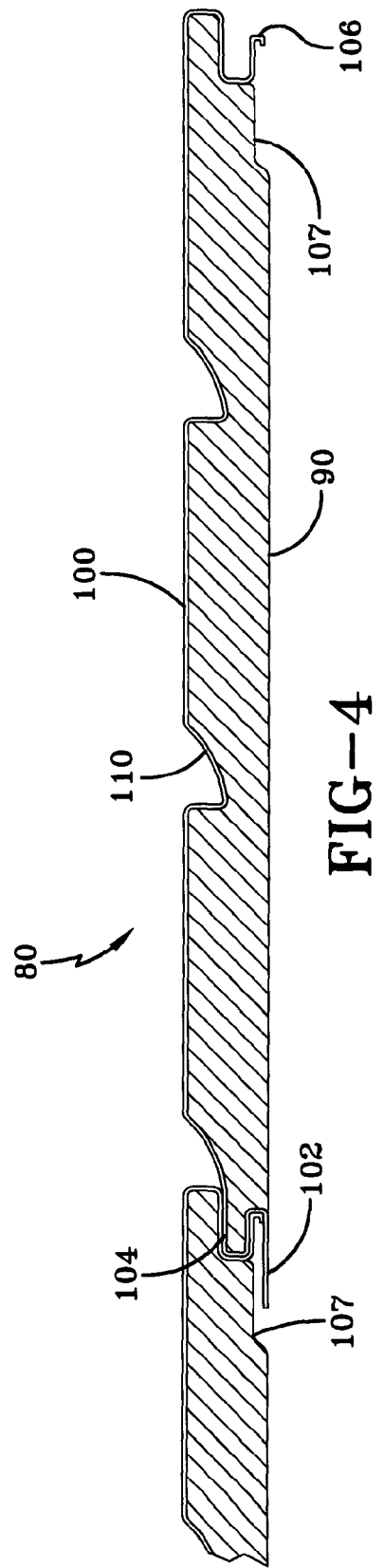

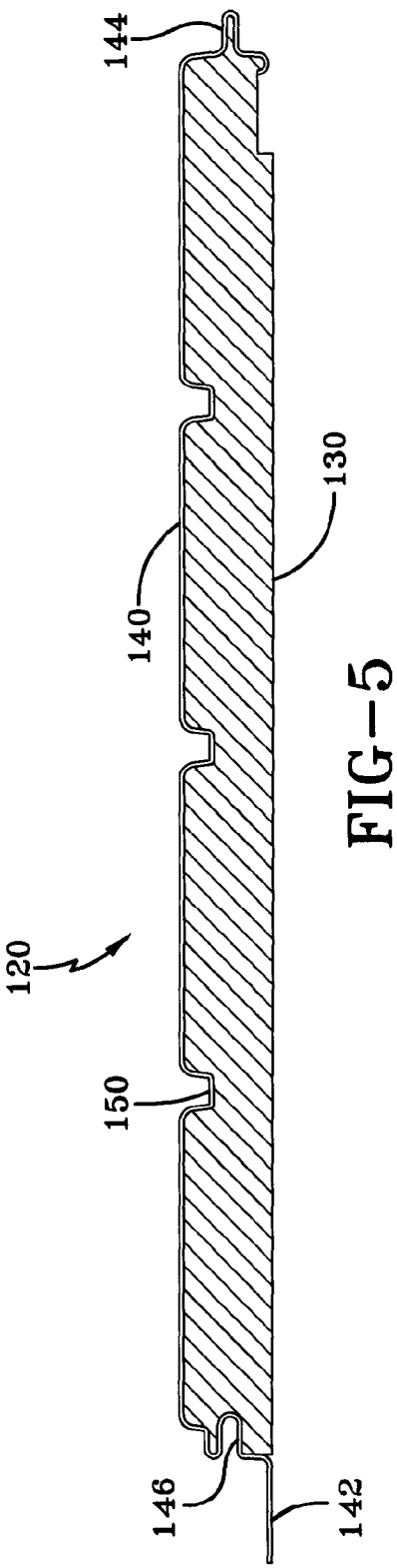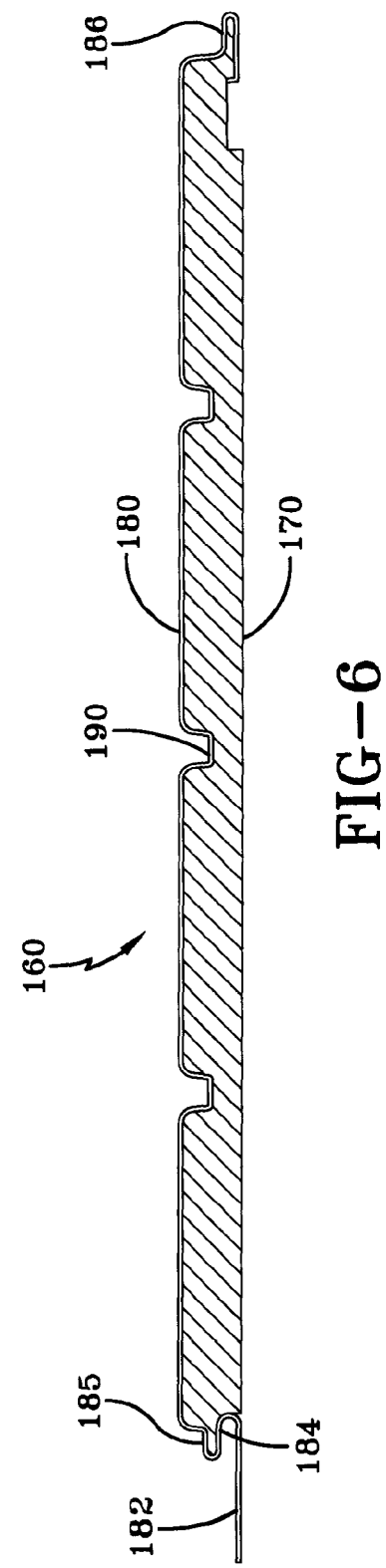

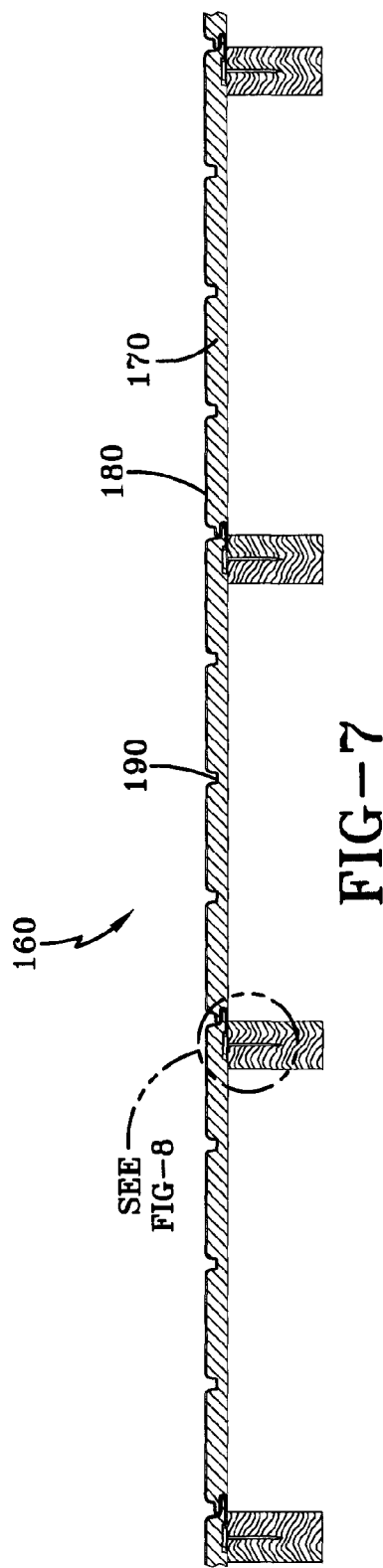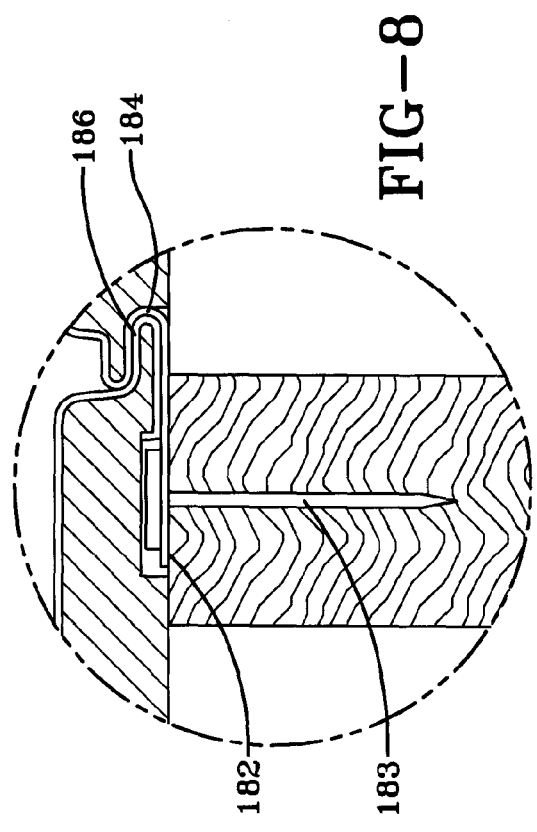

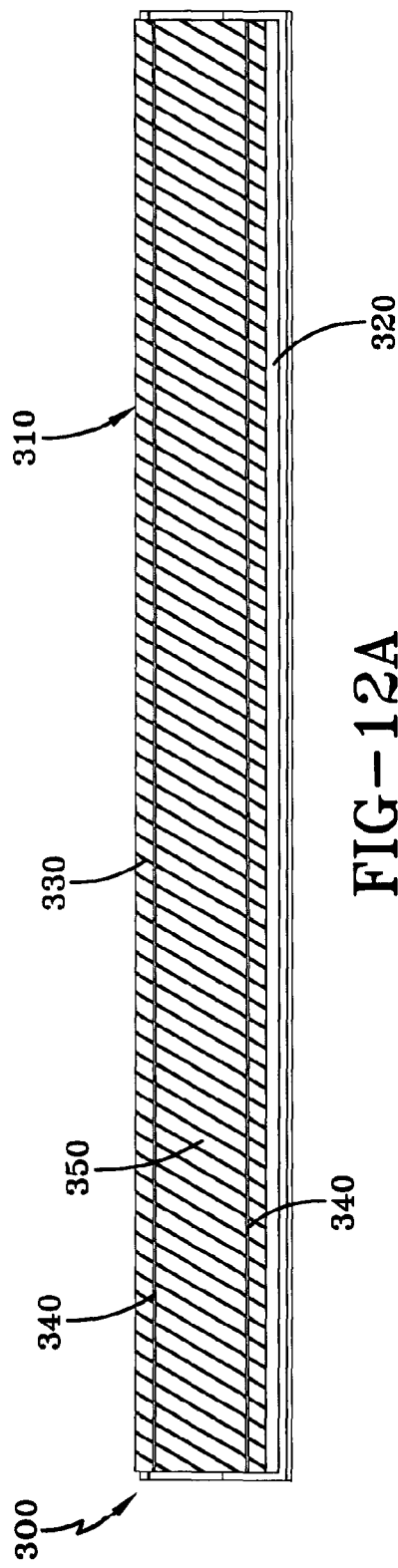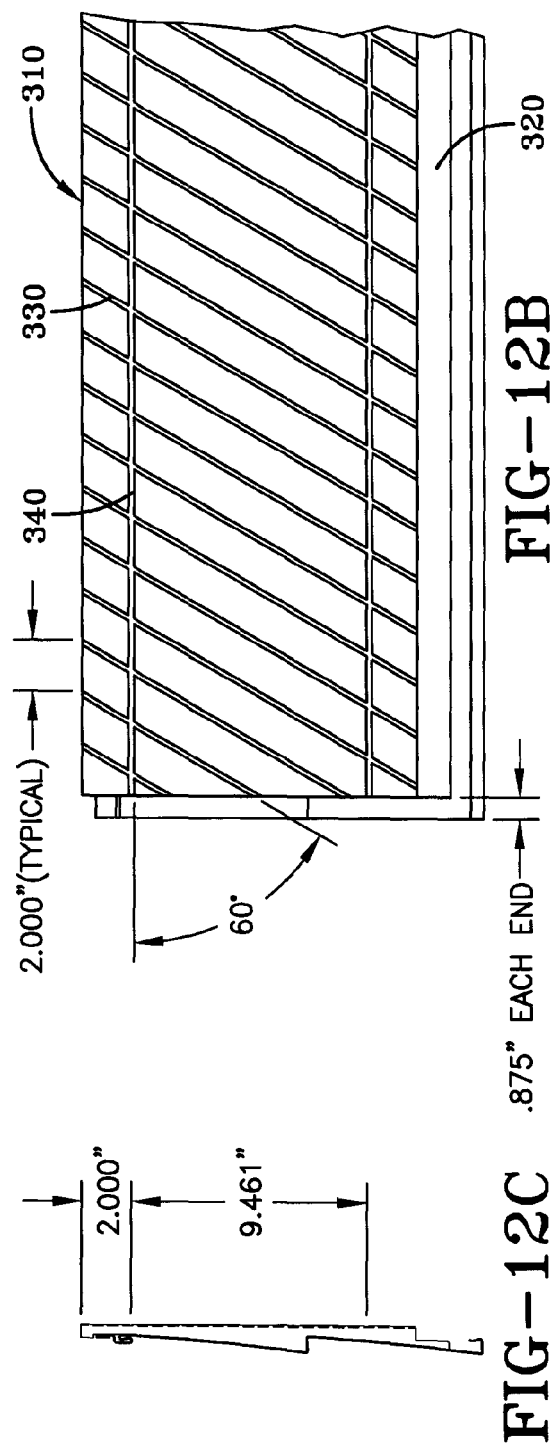

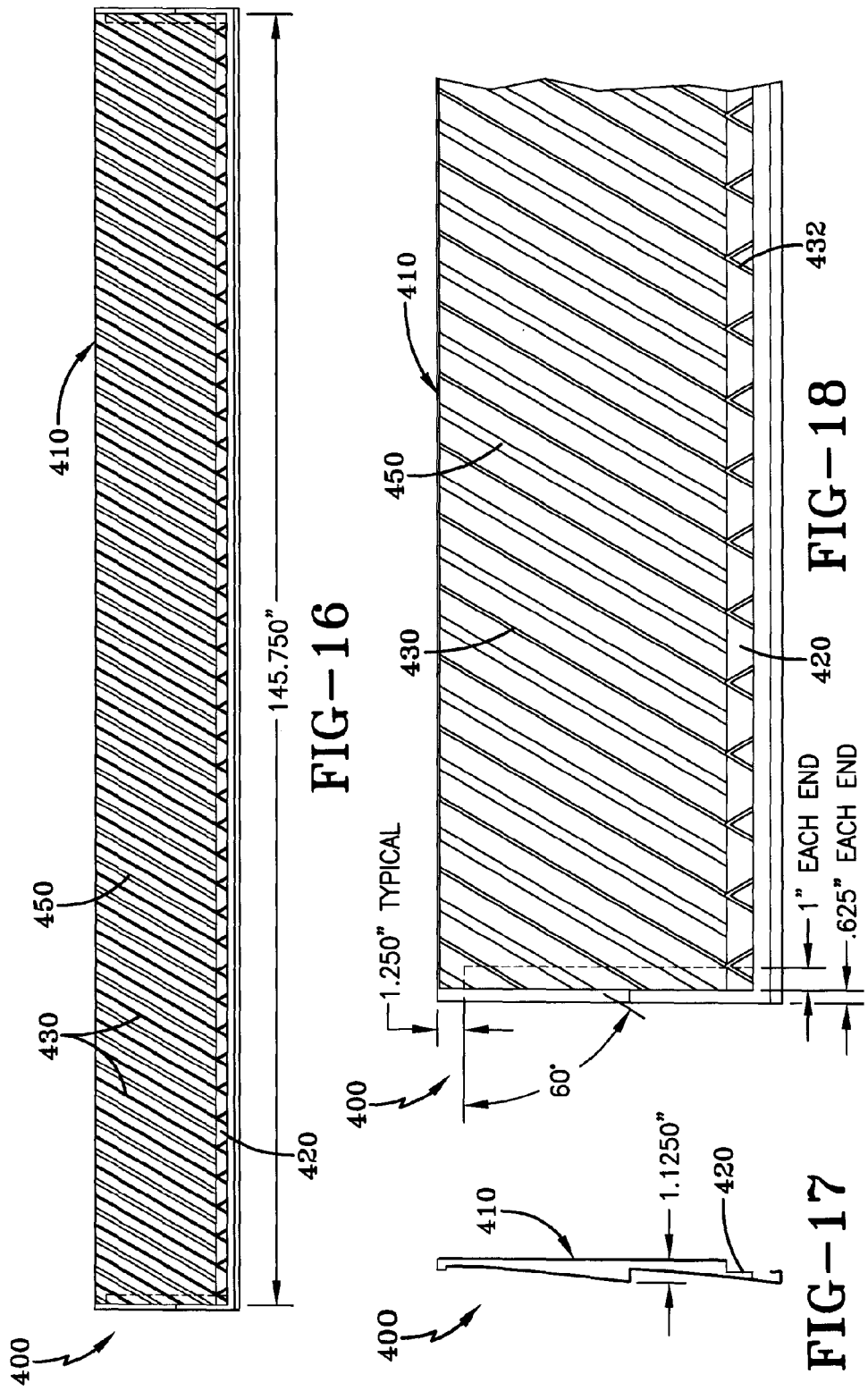

SIDING HAVING FACING AND BACKING PORTION WITH GROOVED AND RIBBED BACKING PORTION SURFACE

This application claims priority to U.S. Provisional Application No. 60/746,708, filed May 8, 2006, which is hereby incorporated by reference in its entirety. This application is also a continuation-in-part of U.S. application Ser. No. 11/234,073, filed Sep. 23, 2005, which is a continuation-in-part of U.S. application Ser. No. 10/688,750, now abandoned, filed Oct. 17, 2003, each of which is hereby incorporated by reference in its entirety.

BACKGROUND AND SUMMARY OF THE INVENTION

The present invention relates generally to backed panels for building structures. Examples of panels that may benefit from the present invention include siding panels, wall panels, and other similar, suitable, or conventional types of panels. For instance, U.S. Pat. No. 6,321,500 is incorporated by reference as one example of a backed panel that may benefit from the present invention.

In order to enhance the thermal insulation of building structures, it is known to provide one or more layers or panels of insulating material between a vinyl facing panel and a building structure. The backing may also improve the structural characteristics of the facing panel. Known insulated siding systems exist in many different forms. For instance, it is known to nail large sheets of insulating material to the building structure and then install the siding over the insulating material. Another system places a panel of insulation material in a slot behind the vinyl facing panel. Yet another system pours foam filler into the back of a vinyl facing panel such that the foam filler conforms to the geometry of the vinyl facing panel.

Moisture may accumulate behind a backed panel due to a variety of reasons including condensation and rain. The accumulation of moisture behind a backed panel may eventually lead to numerous problems. For instance, prolonged exposure to moisture may cause damage to the backed panel including, but not limited to, delamination, deterioration, oil canning, and other types of moisture damage. In addition, the accumulation of moisture may lead to the growth of mold, mildew, fungi, and other types of growth on the underlying structure and the backed panel. The moisture may even cause other types of damage to the underlying structure such as rotting, deterioration, and other types of moisture damage.

One exemplary embodiment of the present invention provides a drainage pathway, which is comprised of at least one groove, for a liquid on a surface of a backing portion of a paneling unit. For example, a backing portion may include a plurality of drainage grooves that may enable a liquid to drain. Optionally, at least one connector groove may be provided that may intersect at least two drainage grooves. As a result, an exemplary embodiment of the present invention may optionally provide alternative drainage pathways in a system of connected drainage grooves and connector grooves.

Another exemplary embodiment of the present invention may optionally include at least one rib. Optionally, a rib may be adjacent to a drainage groove or between adjacent drainage grooves. A rib may assist with liquid drainage. In addition, a rib may also enable ventilation behind the backing portion. Improved ventilation may help to prevent damage to the backing portion or an overall paneling unit. In addition, improved ventilation may help to prevent damage to an underlying structure such as may be caused by moisture.

In addition to the novel features and advantages mentioned above, other features and advantages of the present invention will be readily apparent from the following descriptions of the drawings and exemplary embodiments.

BRIEF DESCRIPTION OF THE DRAWINGS

FIG. 1 is a side elevation view of an assembly including a first exemplary embodiment of a backed siding unit according to the present invention.

FIG. 2 is a side elevation view of the siding unit shown in FIG. 1.

FIG. 3 is a side elevation view of an assembly including a second exemplary embodiment of a siding unit of the present invention.

FIG. 4 is a side elevation view of an assembly including a third exemplary embodiment of a siding unit of the present invention.

FIG. 5 is a side elevation view of an exemplary embodiment of a wall panel unit of the present invention.

FIG. 6 is a side elevation view of another exemplary embodiment of a wall panel unit of the present invention.

FIG. 7 is a side elevation view of an assembly of paneling units of FIG. 6.

FIG. 8 is a side elevation view of a designated portion of FIG. 7.

FIG. 12A is a rear elevation view of an exemplary embodiment of a paneling unit of the present invention (dimensions are provided for the purpose of example only).

FIG. 12B is a partial rear elevation view of the paneling unit of FIG. 12A (dimensions are provided for the purpose of example only).

FIG. 12C is a side elevation view of the paneling unit of FIG. 12A (dimensions are provided for the purpose of example only).

FIG. 16 is a rear elevation view of another exemplary embodiment of a paneling unit of the present invention (dimensions are provided for the purpose of example only).

FIG. 17 is a side elevation view of the paneling unit of FIG. 16 (dimensions are provided for the purpose of example only).

FIG. 18 is a partial rear elevation view of the paneling unit of FIG. 16 (dimensions are provided for the purpose of example only).

DETAILED DESCRIPTION OF EXEMPLARY EMBODIMENT(S)

Figures 9, 10, 11:
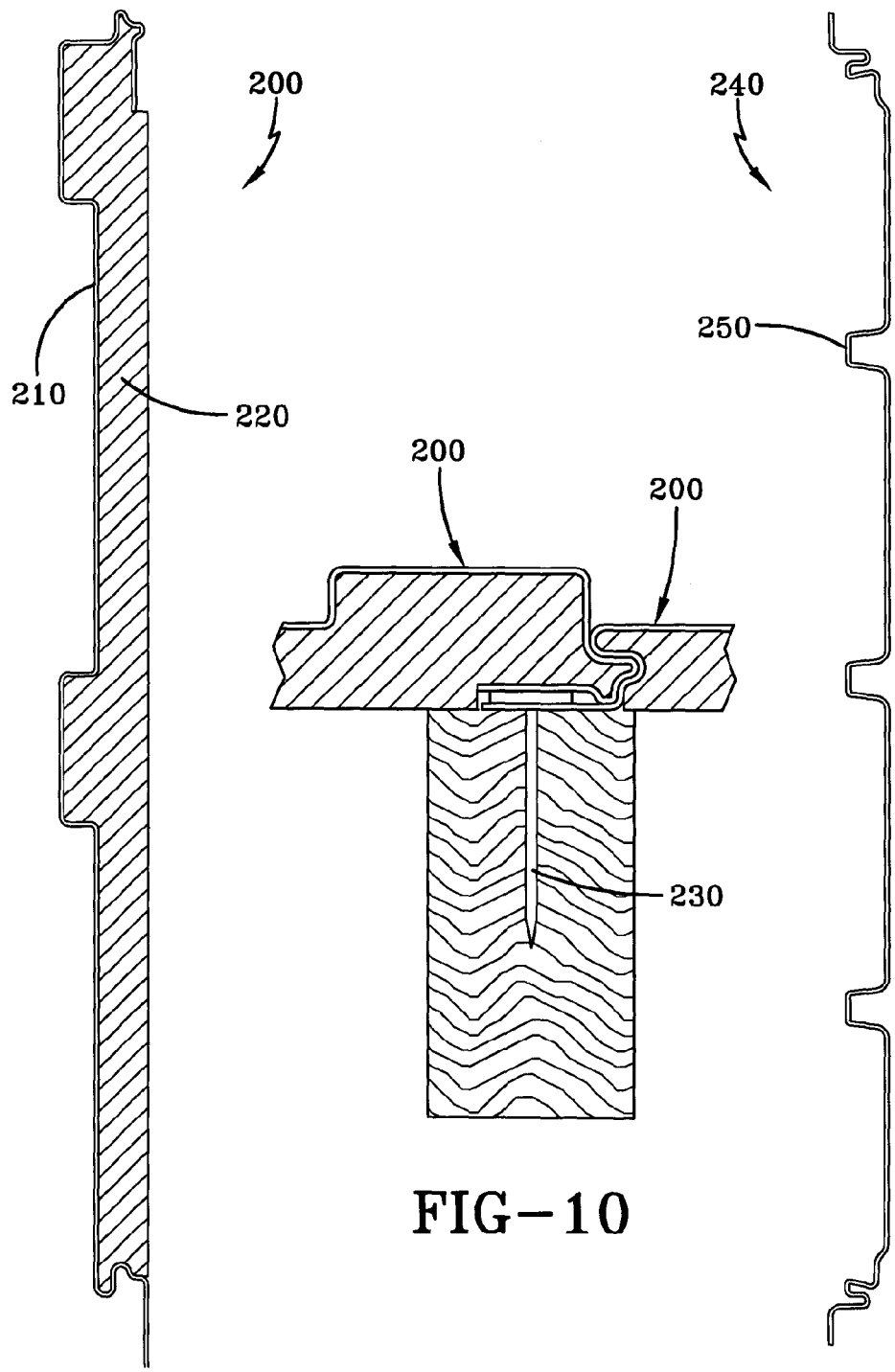
FIG. 9 is a side elevation view of a third exemplary embodiment of a wall panel unit of the present invention.
FIG. 10 is a partial side elevation view of an assembly including the paneling units shown in FIG. 9.
FIG. 11 is a side elevation view of a fourth exemplary embodiment of a wall panel of the present invention.

The present invention is directed to a backed paneling unit. FIGS. 1 through 11 illustrate exemplary embodiments of a paneling unit of the present invention. FIGS. 1 and 2 show a siding unit 10 with two rows of siding. Nevertheless, it should be understood that a paneling unit of the present invention may be manufactured with any desired number of rows or sections.

In FIGS. 1 and 2, the siding unit 10 includes backing portion 20 and at least one facing or cover panel or portion 30. For example, the backing portion 20 may be comprised of a base of either expanded or extruded polystyrene foam. However, it should be recognized that the backing portion 20 may be comprised of any sufficiently rigid material, including, but not limited to, foam, fiberglass, cardboard, and other similar, suitable, or conventional materials. Any suitable means may be used to obtain the shape of the backing portion 20. In an exemplary embodiment, the shape of the backing portion 20 may be obtained by molding, extrusion through a predetermined die configuration, and/or by cutting such as with a power saw or other cutting devices.

The backing portion 20 may be glued or otherwise laminated or attached to the inside of the cover panel 30. For example, an adhesive may be used to bond a portion of a backed portion 20 to a portion of the inside of a facing panel 30.

In addition, the facing portion 30 may include an attachment strip 32 (e.g., a nailing strip), a tongue 34, and a groove 36. The facing panel 30 of the present invention has a portion 35 that rearwardly extends to attachment strip 32. The portion 35, alone or in combination with attachment strip 32, substantially covers the end or tip of the backing portion 20. More particularly, the portion 35 wraps around and abuts or is substantially adjacent to the end or tip of the backing portion 20. As a result, the portion 35 protects the end or tip of the backing portion 20 from damage, particularly during shipping and installation. In this example, the attachment strip 32 is substantially in the same plane and parallel to an adjacent portion of the rear side of the backing portion 20. A channel 37 on the bottom portion of the backing portion 20 may be adapted to interlock with, overlap, and/or extend over the nailing strip 32 of the facing panel 30 of a substantially similar siding unit 10. The nailing strip (also called a nailing hem) 32 may have a plurality of openings for receiving fasteners. Nails or any other suitable mechanical fastening means may be extended through apertures in the nailing strip 32 in order to secure the facing panel 30 to a building structure. As is shown in FIG. 1, the tongue 34 is adapted to fit in the groove 36 of another siding panel when installed on a building structure. Likewise, the groove 36 is adapted to receive the tongue 34 of a substantially similar siding panel when installed on a building structure. The tongue-and-groove connection may also be referred to as a hanger section.

The top or face portion of the siding unit 10 may have a facing panel 30, which completely covers the backing portion 20. A benefit of this feature is that the backing portion 20 is protected from breakage that may occur in shipping, handling, or installation if not substantially covered with a facing panel 30.

FIG. 3 shows an embodiment of a siding unit 40 in which the backing portion 50 extends into the groove 66. The tongue 64 is adapted to fit into the groove 66 of an adjacent siding unit. The unit also has a nailing hem 62, which may or may not have an aperture for fastening the siding unit down. A channel 67 on the bottom portion of the backing portion 50 is adapted to interlock with, overlap, and/or cover the nailing strip 62 of the facing panel 60 of a substantially similar siding unit 40.

In FIGS. 3 through 6, the facing panels 60, 100, 140, and 180, respectively, have flat top surfaces that are substantially parallel to the structure on which the paneling unit is adapted to be installed. In these examples, the facing panels have regularly space indentures or recessed portions 70, 110, 150, and 190, respectively.

FIG. 4 shows an embodiment of the present invention. The siding unit 80 has a backing portion 90 and a facing panel 100. The facing panel 100 includes an attachment strip or hem 102, a tongue 104, and a groove 106. In this embodiment, the facing panel 100 substantially covers the top end or tip and the bottom end or tip of the backing portion 90. The tongue 104 extends around and abuts or is substantially adjacent to the top end or tip of the backing portion 90. Also, the groove 106 wraps around and abuts or is substantially adjacent to the bottom end or tip of the backing portion 90. A terminal portion of the groove 106 extends away from a channel 107 on the rear side of the bottom portion of the backing portion 90. The channel 107 may be adapted to interlock with, overlap, and/or extend over the nailing strip 102 of the facing panel 100 of a substantially similar siding unit 80. The channel 107 may provide a sufficient amount of clearance for the top of a mechanical fastener such as a nail, which may extend through the nailing strip 102 of an adjacent siding unit 80.

FIG. 5 represents an exemplary embodiment of a wall panel unit 120 of the present invention. The paneling unit 120 has a backing portion 130 and a facing panel 140. The facing panel 140 includes an attachment strip or hem 142, a tongue 144, and a groove 146. This embodiment of the facing panel 140 also substantially covers the top end or tip and the bottom end or tip of the backing portion 130. In this example, the tongue 144 extends around and abuts or is substantially adjacent to the bottom end or tip of the backing portion 130, and the groove 146 wraps around and abuts or is substantially adjacent to the top end or tip of the backing portion 130. A terminal portion of the facing panel 140 may extend around the bottom end or tip of the backing portion 130 and into a channel on the rear side of the bottom portion of the backing portion 130. The channel may be adapted to interlock with, overlap, and/or extend over the nailing strip 142 of the facing panel 140 of a substantially similar paneling unit 120. The channel may provide a sufficient amount of clearance for the top of a mechanical fastener such as a nail, which may extend through the nailing strip 142 of an adjacent paneling unit 120.

FIG. 6 shows an embodiment of a paneling unit 160 of the present invention. The paneling unit 160 has a backing portion 170 and a facing panel 180. The facing panel 180 includes an attachment strip or hem 182, a groove 184, a tongue 185, and another tongue 186. This is another embodiment in which the facing panel 180 substantially covers the top end or tip and the bottom end or tip of the backing portion 170. In this example, the groove 184 is formed between the nailing strip 182 and the tongue 185. Both the groove 184 and the tongue 185 abut or are substantially adjacent to the top end or tip of the backing portion 170. On the other hand, the tongue 186 extends around and abuts or is substantially adjacent to the bottom end or tip of the backing portion 170. As shown in the example, a channel may be formed on the rear side of the bottom portion of the backing portion 170. The channel may be adapted to interlock with, overlap, and/or extend over the nailing strip 182 of the facing panel 180 of a substantially similar paneling unit 160. The channel may provide a sufficient amount of clearance for the top of a mechanical fastener such as a nail, which may extend through the nailing strip 182 of an adjacent paneling unit 160. Optionally, the facing panel 180 may extend around the bottom end or tip of the backing portion 130 and into the channel.

The paneling unit of FIG. 6 is adapted to be connected to adjacent, substantially similar paneling units as shown in FIG. 7. A designated portion of FIG. 7 is shown in FIG. 8. The tongue 186 of one paneling unit is situated in the groove 184 of an adjacent paneling unit. A fastener 183 is shown in an aperture of the nailing strip or hem 182.

FIGS. 9 through 11 illustrate some other embodiments of paneling units of the present invention that include some or all of the aforementioned features. FIG. 9 shows a wall panel unit 200 that is comprised of a facing panel 210 and a backing portion 220. FIG. 10 shows a fastener 230 connecting adjacent paneling units 200 together. A wall panel unit 240 comprising a facing panel 250 is shown in FIG. 11. It should be recognized that the wall panel unit 240 may include a backing portion. However, it should also be recognized that some embodiments of paneling units of the present invention may not include a backing portion.

Figures 14, 15:
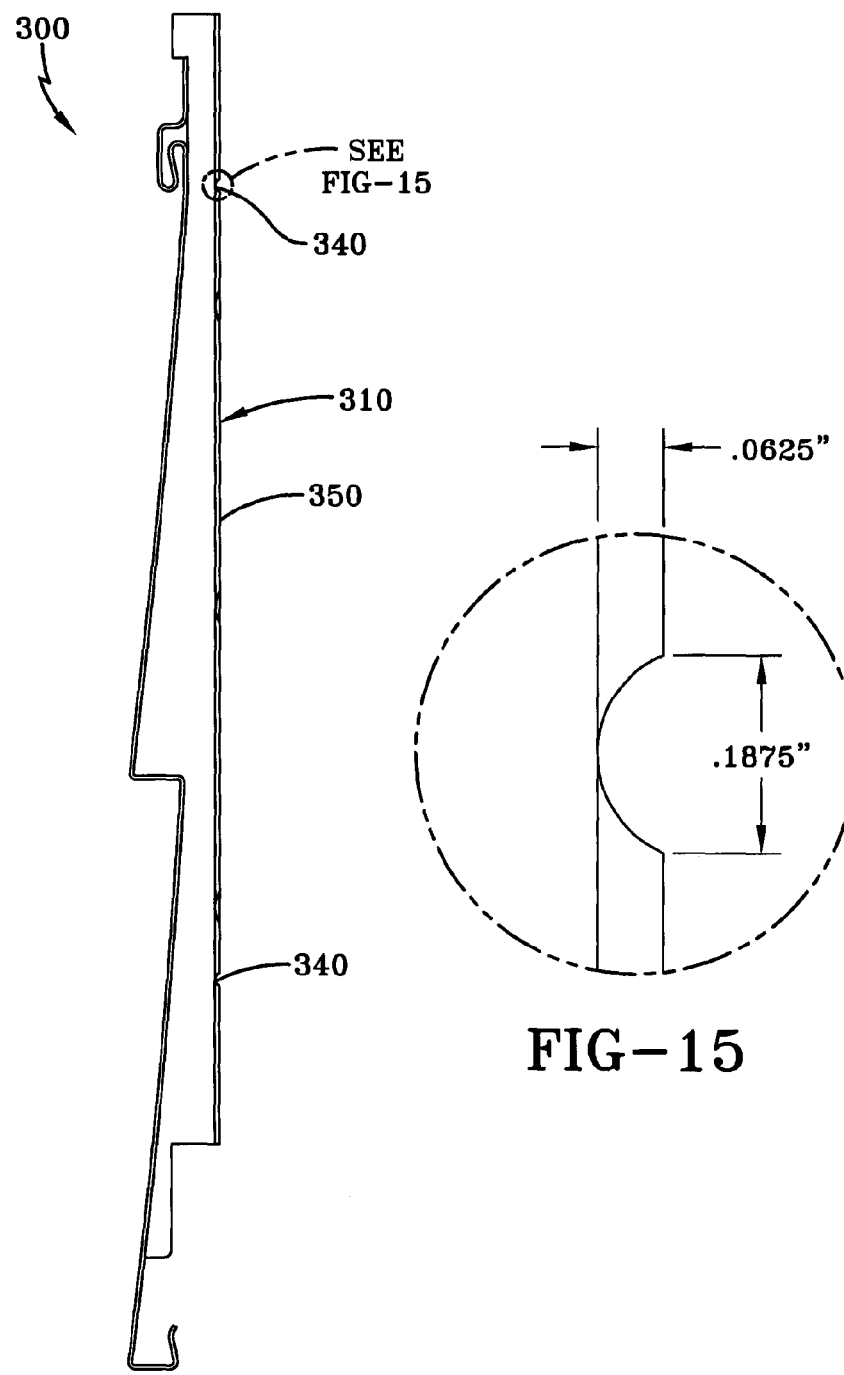
FIG. 14 is another side elevation view of the paneling unit of FIG. 12A.
FIG. 15 is a detail view of a groove of the paneling unit of FIG. 12A (dimensions are provided for the purpose of example only).

FIGS. 12A through 15 show another exemplary embodiment of a paneling unit of the present invention. Such as shown in FIGS. 12C and 14, a paneling unit of the present invention may be installed such that it is approximately or generally vertical. Nevertheless, it is not intended to limit the present invention to the orientation of the paneling unit when installed, unless expressly claimed otherwise.

Figure 13:
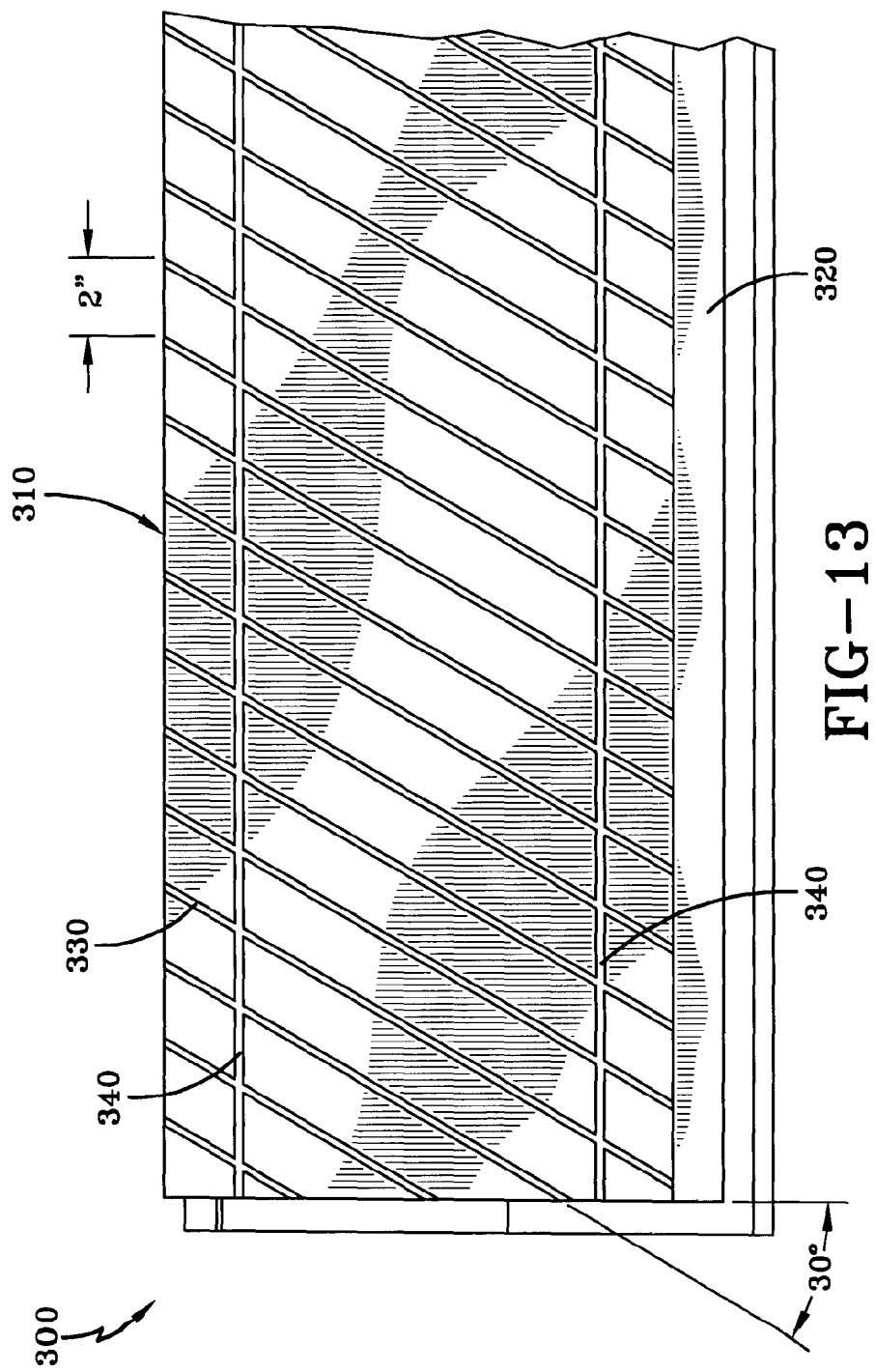
FIG. 13 is a partial rear elevation view of the paneling unit of FIG. 12A (dimensions are provided for the purpose of example only).

As may be observed in FIGS. 12A, 12B, and 13, backing portion 310 of paneling unit 300 may optionally be comprised of a bottom portion defining a channel 320. Backing portion 310 may also include at least one drainage groove 330 on a surface 350. In addition, backing portion 310 may optionally comprise at least one connector groove 340 on surface 350.

A drainage groove 330 may have any suitable orientation that enables it to provide a drainage pathway for a liquid. Such as shown in this exemplary embodiment, drainage grooves 330 may be angled downward to provide a drainage pathway for a liquid such as water (e.g., an accumulation of water such as may be produced from condensation or rain). An angled orientation may facilitate the collection of liquid in the drainage grooves 330. In particular, as shown in FIGS. 12A and 12B, and with even greater detail in FIG. 13, an exemplary embodiment of a paneling unit of the present invention may have a plurality of drainage grooves 330 oriented at an angle of approximately 30° from vertical (i.e., about 60° from horizontal) with respect to the longitudinal length of the drainage groove 330. In addition, drainage grooves 330 may be spaced about every 2.0 inches in this example. Alternatively, drainage grooves of other embodiments of the present invention may be placed at other angles and/or spaced at other distances on the surface of the backing portion. Exemplary embodiments of the present invention may have drainage grooves on the surface of the backing portion in any generally downward trend so as to facilitate the drainage of liquid. Other alternative embodiments of the present invention may use drainage grooves that intersect other drainage grooves. In addition, alternative embodiments of the present invention may use other patterns of drainage grooves, which may not necessarily be defined by straight lines, to facilitate the drainage of liquid.

In this example, drainage grooves 330 may not extend into optional channel 320. However, in other exemplary embodiments of the present invention, a drainage groove may extend to the bottom edge of a backing portion (e.g., through the optional channel).

In this example, at least one connector groove 340 intersects at least one drainage groove 330 on a surface of a backing portion of a paneling unit. Other variations are possible and considered within the scope of the present invention. Generally, the relationship between at least one drainage groove 330 and at least one connector groove 340 on a surface of a backing portion is that the grooves may be hydraulically connected. In other words, as may be noted from the position of the optional connector grooves 340, the intersection of connector grooves 340 with drainage grooves 330 may provide alternate pathways for a liquid to drain. As a result, if a particular drainage groove 330 is plugged or obstructed, excess liquid may be diverted to drain through another drainage groove 330 by its transfer via an intersecting connector groove 340. In this example, a connector groove 340 may be generally horizontal. However, other suitable orientations of a connector groove 340 are possible and considered within the scope of the present invention. Alternative embodiments of the present invention allow for connector grooves to be generally oriented in any suitable direction.

FIG. 14 is a side elevation view of paneling unit 300. This view of the exemplary embodiment of the present invention shows a pair of generally horizontal connector grooves 340 on surface 350 of backing portion 310. In other embodiments, an optional connector groove may not necessarily extend to the side edge of a backing portion.

FIG. 15 is a detail view of a drainage groove 330 or connector groove 340. Particularly, this view of an embodiment of the present invention is intended to show exemplary dimensions and a shape for connector grooves and drainage grooves of the present invention. As shown, either type of groove may generally be a curved groove having a depth of about 0.0625 inch and a width of about 0.1875 inch. The shape and dimensions of a groove may vary as needed. In an exemplary embodiment of the present invention, a groove may not be placed deep enough to penetrate through the entire backing portion of a paneling unit. Instead, the grooves of the present invention may be sized, shaped, and placed so as to adequately allow a liquid to drain from the surface of the backing portion of the paneling unit.

Figure 19:
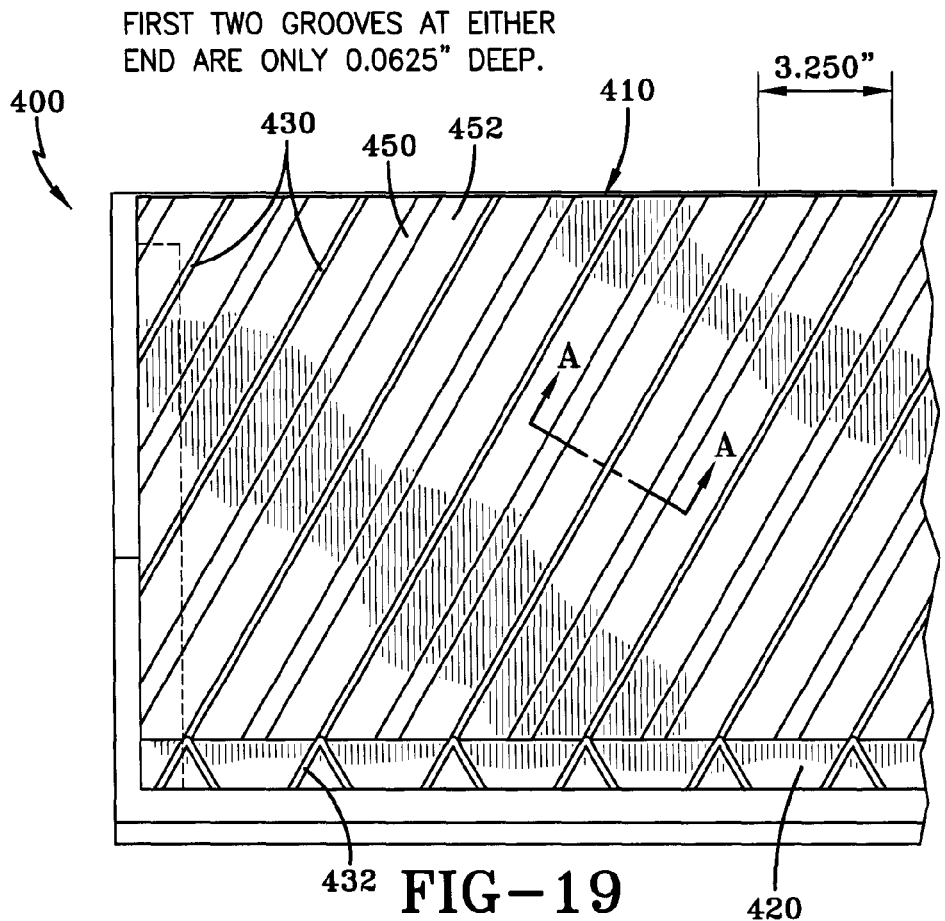
FIG. 19 is another partial rear elevation view of the paneling unit of FIG. 16 (dimensions are provided for the purpose of example only).
Figure 20:
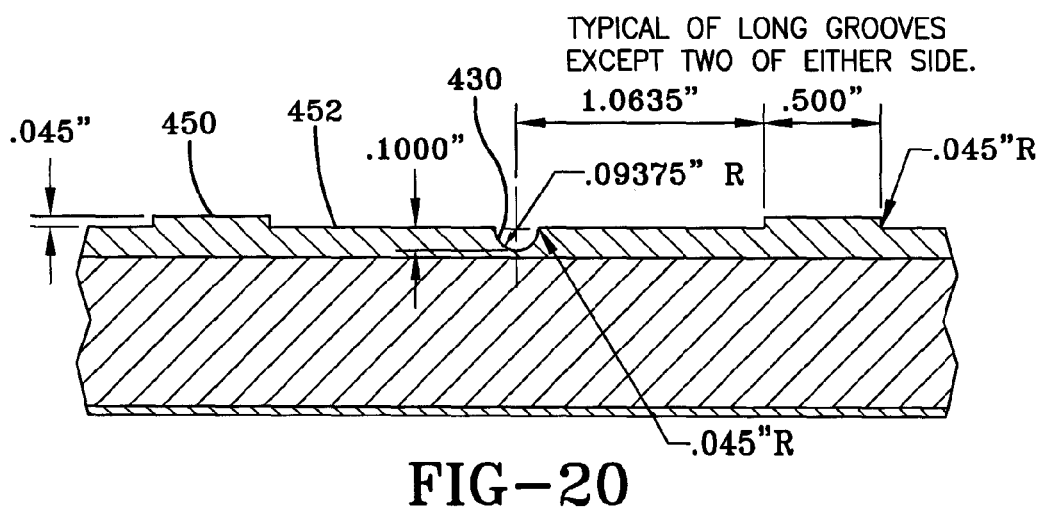
FIG. 20 is a cross-section view along section 20-20 of FIG. 19 (dimensions are provided for the purpose of example only).
Figure 21:
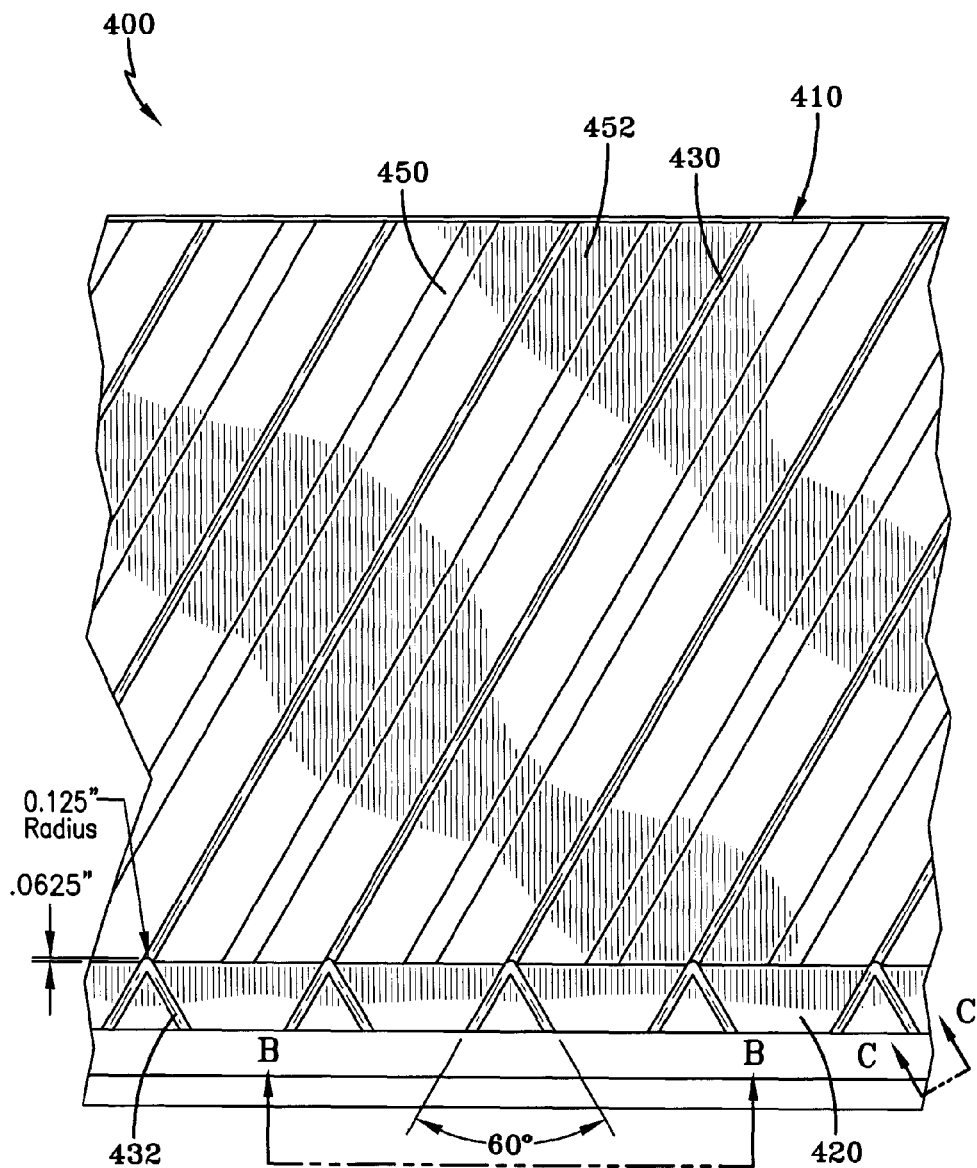
FIG. 21 is another partial rear elevation view of the paneling unit of FIG. 16 (dimensions are provided for the purpose of example only).
Figure 22:
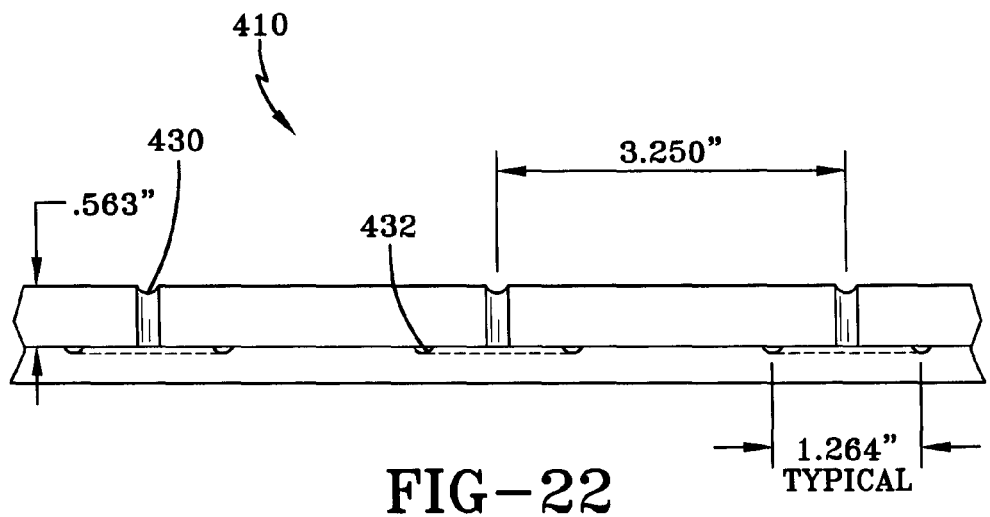
FIG. 22 is a partial detail view of V-shaped groove portions of the backing panel of the paneling unit of FIG. 16 taken along section line 22-22 of FIG. 21 (dimensions are provided for the purpose of example only).
Figure 23:
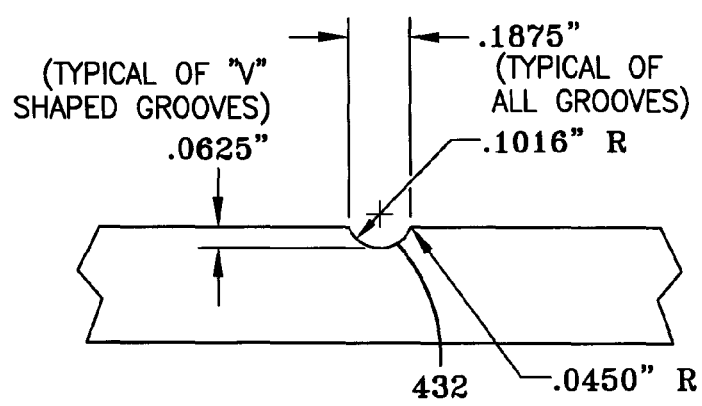
FIG. 23 is a detail view of a groove section of a V-shaped groove portion of the backing panel of the paneling unit of FIG. 16 taken along section line 23-23 of FIG. 21 (dimensions are provided for the purpose of example only).

FIGS. 16 through 23 illustrate another exemplary embodiment of a paneling unit 400 comprised of a backing portion 410. This exemplary embodiment of backing portion 410 may also comprise an optional channel 420 and at least one drainage groove 430. Similar to the previous embodiment (i.e., drainage grooves 330), drainage grooves 430 may facilitate the drainage of a liquid such as condensation or rain. Like a drainage groove 330, a drainage groove 430 of this example may be oriented about 60° from horizontal. However, in this embodiment, drainage grooves 430 are spaced about every 3.250 inches. In addition, drainage grooves 430 may vary in shape. In particular, as shown in FIGS. 19 and 20, the first two drainage grooves 430 at the ends (i.e., the side edges) of backing portion 410 may have a depth of only about 0.0625 inch, whereas the remaining drainage grooves 430 may have a depth of about 0.1000 inch. As shown in FIG. 23 and FIG. 20, respectively, a drainage groove 430 may have a width of about 0.1875 inch and a radius curvature of about 0.09375 inch. Nevertheless, it should again be recognized that drainage grooves 430 may have any suitable dimensions, spacing, shape, and pattern for facilitating the drainage of a liquid.

In this exemplary embodiment, at least one drainage groove 430 may extend through channel 420. In particular, such drainage grooves 430 include a V-shaped groove portion 432. V-shaped groove portion 432 may facilitate drainage by providing alternate drainage pathways. In particular, a V-shaped groove portion 432 may approximately form a 60° angle in this example as shown in FIG. 21, wherein the respective centers of the groove sections of a V-shaped portion 432 may be about 1.264 inches apart as shown in FIG. 22. In this exemplary embodiment, a groove section of a V-shaped portion 432 of drainage groove 430 may have a depth of about 0.0625 inch, a width of about 0.1875 inch, and a radius curvature of about 0.1016 inch as shown in FIG. 23. Nevertheless, a drainage groove 430 may have any suitable dimensions, spacing, shape, and pattern for extending into and/or through channel 420.

Backing portion 410 may include at least one rib 450. In this example, a rib 450 may extend adjacent to a drainage groove 430 or between adjacent drainage grooves 430. More particularly, a rib 450 in this exemplary embodiment may extend substantially parallel to at least one drainage groove 430 from a top edge of backing portion 410 down to channel 420. In other words, a rib 450 may extend at an angle of approximately 60° from horizontal in this example. In other exemplary embodiments of the present invention, a rib may not be substantially parallel to a drainage groove, and a rib may extend at any other suitable angle. In addition, a rib may also extend to a bottom edge of a backing portion (e.g., through a channel), and a rib may start below a top edge of a backing portion. It should also be recognized that a rib may extend only a limited distance over a portion of a backing portion in other exemplary embodiments of the present invention. In addition, multiple ribs may be generally aligned or otherwise situated adjacent to each other in some exemplary embodiments of the present invention.

An exemplary embodiment of a rib 450 may be adapted to facilitate ventilation between backing portion 410 and an underlying structure. In addition, a rib 450 may also facilitate drainage of a liquid. By improving ventilation and/or drainage, a rib 450 may help to lessen or prevent damage to paneling unit 410 or an underlying structure, which may be caused by the accumulation of moisture. For instance, prolonged exposure to moisture may cause problems including, but not limited to, delamination, deterioration, oil canning, rotting, and other types of moisture damage. In addition, a rib 450 may help to lessen or prevent the growth of mold, mildew, fungi, or other types of moisture-related growth.

A rib 450 may have any suitable structure for facilitating ventilation between backing portion 410 and an underlying structure. In this example, a rib 450 is elevated from a primary rear surface 452 of backing portion 410 in which a drainage groove 430 may be formed. In other exemplary embodiments of the present invention, at least one rib may be elevated from a primary rear surface of a backing portion, which has no drainage grooves. Ribs 450 may be spaced about every 3.250 inches in this exemplary embodiment. FIG. 20 provides additional exemplary details about ribs 450. A rib 450 may be situated about 1.0635 inches from the center of a drainage groove 430 in this exemplary embodiment. In addition, a rib 450 may have a width of about 0.500 inch and a depth of about 0.045 inch in this example. Nevertheless, it should be recognized that rib(s) 450 may have any suitable dimensions, spacing, shape, and pattern for facilitating ventilation (i.e., providing an air gap) between backing portion 410 and an underlying structure.

Other variations of the present invention are also possible. Optionally, an exemplary embodiment of the present invention may provide for an orientation of the grooves on the surface of a backing portion such that grooves of adjacent, substantially similar paneling units may be aligned when installed to form a continuous drainage groove between adjacent units. In this manner, liquid may drain from the surfaces of the backing portions of the installed paneling units through an interconnected system of substantially continuous drainage grooves. Additionally, an exemplary embodiment of the present invention may optionally provide for at least one connector groove on a surface of a backing portion of a paneling unit to form at least a segment of a substantially continuous connector groove with an adjacent, substantially similar paneling unit when installed. As discussed above, the optional substantially continuous grooves between adjacent panels may further facilitate the drainage of liquid from the surfaces of the backing portions of installed paneling units.

One exemplary embodiment of the present invention may provide a siding unit, which is comprised of backing panel and a facing panel. Other types of paneling units comprising a facing panel and a backing panel (e.g., a wall panel unit) are considered to be within the scope of the present invention. Some advantages of a backed panel of the present invention may include improved energy efficiency, reduced air infiltration, reduced curvature in the facing panels, increased ease of installation, improved drainage, and/or improved ventilation. An exemplary embodiment of a backed paneling unit of the present invention may optionally include improved interlocking pieces and an improved backing. Chemicals may optionally be added to the backing portion that aid in the reduction or repelling of insects such as carpenter ants and termites.

The top or face portion of the paneling units may be smooth or may have any number of finishes that are known by those in the art of manufacturing paneling. The finish may add contour and texture to simulate the appearance of wooden paneling.

The paneling units of the present invention may be of various lengths, heights, and thicknesses. The particular dimensions of a panel of the present invention may be selected to suit a particular application. Some exemplary embodiments of a paneling unit of the present invention may be approximately 15 to 18 inches in height. However, as just mentioned, it should also be recognized that a paneling unit of the present invention may have any desired dimensions including a height up to or in excess of 50 inches.

The paneling units as described herein may be formed from a polymer such as a vinyl material. Other materials such as polypropylene, polyethylene, other plastics and polymers, polymer composites (such as polymer reinforced with fibers or other particles of glass, graphite, wood, flax, other cellulosic materials, or other inorganic or organic materials), metals (such as aluminum or polymer coated metal), or other similar or suitable materials may also be used. The paneling may be molded, extruded, roll-formed from a flat sheet, vacuum formed, or formed by any other suitable manufacturing technique.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A paneling unit adapted to be installed on an underlying structure, said paneling unit comprising:
   a facing portion; and
   a backing portion secured to said facing portion, said backing portion comprising a primary rear surface that is substantially planar, at least one rib relative to said primary rear surface and having an upper surface that is substantially parallel to said primary rear surface, and at least one drainage groove relative to said primary rear surface and adjacent to said at least one rib;
   wherein said at least one rib is adapted to facilitate ventilation between said backing portion and said underlying structure.

2. The paneling unit of claim 1 wherein said at least one rib is adapted to extend generally downward when said paneling unit is installed.

3. The paneling unit of claim 1 wherein said at least one rib is adapted to extend at approximately 60° from horizontal when said paneling unit is horizontally installed.

4. The paneling unit of claim 1 wherein said at least one rib has a depth of approximately 0.045 inch.

5. The paneling unit of claim 1 wherein said at least one rib has a width of approximately 0.500 inch.

6. The paneling unit of claim 1 wherein said at least one rib is approximately 1.0635 inches from a center of said at least one drainage groove.

7. The paneling unit of claim 1 wherein said at least one rib extends between a pair of said drainage grooves.

8. The paneling unit of claim 1 wherein said at least one drainage groove extends from an edge of said backing portion to another edge of said backing portion.

9. A paneling unit comprising:
   a facing portion; and
   a backing portion secured to said facing portion, said backing portion comprising a primary rear surface that is substantially planar, at least one rib relative to said primary rear surface and having an upper surface that is substantially parallel to said primary rear surface, and at least one drainage groove relative to said primary rear surface;
   wherein said at least one rib is substantially parallel to said at least one drainage groove.

10. The paneling unit of claim 9 wherein said at least one rib is adapted to extend generally downward when said paneling unit is installed.

11. The paneling unit of claim 9 wherein said at least one rib is adapted to extend at approximately 60° from horizontal when said paneling unit is horizontally installed.

12. The paneling unit of claim 9 wherein said at least one rib has a depth of approximately 0.045 inch.

13. The paneling unit of claim 9 wherein said at least one rib has a width of approximately 0.500 inch.

14. The paneling unit of claim 9 wherein said at least one drainage groove is adjacent to said at least one rib.

15. The paneling unit of claim 9 wherein said at least one rib is approximately 1.0635 inches from a center of said at least one drainage groove.

16. The paneling unit of claim 9 wherein said at least one rib extends between a pair of said drainage grooves.

17. The paneling unit of claim 9 wherein said at least one drainage groove extends from an edge of said backing portion to another edge of said backing portion.

18. A paneling unit comprising:
   a facing portion; and
   a backing portion secured to said facing portion, said backing portion comprising a primary rear surface that is substantially planar, at least one rib relative to said primary rear surface and having an upper surface that is substantially parallel to said primary rear surface, and at least one drainage groove relative to said primary rear surface, said at least one rib and said at least one drainage groove extending from a top edge to a bottom channel of said backing portion;
   wherein said at least one rib and said at least one drainage groove are substantially parallel.

19. The paneling unit of claim 18 wherein:
   said at least one rib does not extend into said bottom channel; and
   said at least one drainage groove extends into said bottom channel.

20. A siding panel comprising:
   a siding material having a face and a back; and
   a backer material applied to said back of said siding material, said backer material adapted to be installed adjacent to an exterior surface of a structure;
   wherein said backer material includes a primary rear surface that is substantially planar, at least one depth portion relative to said primary rear surface, and at least one elevated portion relative to said primary rear surface and having an upper surface that is substantially parallel to said primary rear surface;
   wherein said primary rear surface, said at least one depth portion, and said at least one elevated portion are adapted to be adjacent to said exterior surface of said structure when installed; and
   wherein said at least one depth portion and said at least one elevated portion are adapted to facilitate fluid flow between said siding panel and said structure.

21. The siding panel of claim 20 wherein said siding material is vinyl.

22. The siding panel of claim 20 wherein said backer material is polystyrene foam.

23. The siding panel of claim 20 wherein said backer material is laminated to said siding material.

24. The siding panel of claim 20 wherein said fluid is air.

25. The siding panel of claim 20 wherein said fluid is water.

* * * * *